US007620569B2

(12) United States Patent
Chiarabini et al.

(10) Patent No.: US 7,620,569 B2
(45) Date of Patent: Nov. 17, 2009

(54) METHOD AND APPARATUS FOR AUTOMATED ON-LINE PRINTING SERVICE

(75) Inventors: Luca Chiarabini, San Diego, CA (US); Manuel Gonzalez, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 1862 days.

(21) Appl. No.: 09/925,519

(22) Filed: Aug. 10, 2001

(65) Prior Publication Data

US 2002/0026379 A1 Feb. 28, 2002

(30) Foreign Application Priority Data

Aug. 11, 2000 (GB) ................... 0019774.9
Aug. 24, 2000 (GB) ................... 0020759.7

(51) Int. Cl.
*G06Q 30/00* (2006.01)

(52) U.S. Cl. .......................................... 705/26; 705/37
(58) Field of Classification Search .................. 705/26, 705/37
See application file for complete search history.

(56) References Cited

U.S. PATENT DOCUMENTS

2003/0140315 A1* 7/2003 Blumberg et al. ............ 715/527

* cited by examiner

*Primary Examiner*—James Zurita

(57) ABSTRACT

There is disclosed an on-line print network comprising a print merchant computer, and a plurality of print service providers. Within each print service provider, orders are satisfied efficiently by optimizing throughput of print jobs within the print service provider, whilst at the same time, minimizing media wastage and achieving high printer device utilization, under control of a print manager computer interfacing with the print merchant computer on the one hand, and with the plurality of printer devices on the other hand.

5 Claims, 14 Drawing Sheets

| Printer ID | Format | Sheet material type | Ink type | Current load |
|---|---|---|---|---|
| 1 | A4 | paper | color 1 | 20 |
| 2 | A0 | plastic | color 2 | 0 |
| 3 | A0 | canvas | color 2 | 2 |
| 4 | A0 | paper | color 1 | 10 |
| 5 | A0 | paper | color 3 | 14 |
| 900 | 901 | 902 | 903 | 904 |

Fig. 9

METHOD AND APPARATUS FOR AUTOMATED ON-LINE PRINTING SERVICE

FIELD OF THE INVENTION

The present invention relates to the field of printing, and particularly, although not exclusively, to a method and apparatus for enabling an improved e-printing service solution.

BACKGROUND TO THE INVENTION

Conventional print service facilities comprise one or a plurality of printers in a single physical location, e.g. a print shop or print room, which provide to a customer a printing service for posters, brochures, leaflets, copies of photographs and the like. Typically, a print service facility may comprise one or more large format printers capable of printing to large format size media, for example a HP DeskJet printer, and may comprise one or a plurality of smaller format printers, for example HP laser jet printers for printing smaller format sizes, e.g. A4 or similar.

Such printers may print images supplied by a customer on data carrier, for example CD ROM, floppy disk or the like. It is known for a print service provider to provide direct to a customer an internet enabled driver for installation on a customers own computer which is capable of sending customer generated images from the customer's computer to a computer at the print facility. Such systems are limited to single print companies providing proprietary internet enabled drivers to their customers, for using the facilities of the print service provider only.

Mediaflex.com (http://www.mediaflex.com) offer an internet accessible printing service using a standard web browser interface. This service is of the type provided by a single print service provider directly to their customers.

Barnes and Noble provide the known ByEnlarged service, which provides a centralized printing facility in a single location. However, this solution only supports limited print sizes.

The known Mimeo service provides centralized printing, but is restricted to serving US customers only, and provides small format prints, supporting only a single paper size.

Prior art on-line print service solutions are restricted to a small number of individual print service providers offering on-line image transfer facilities to their customers.

Problems associated with known on-line printing services include transfer of content data across low bandwidth internet connections, poor reliability, unattendedness of print service provider computer devices, human error, the cost involved in running max production of 'unique' print articles, i.e. print on demand articles, and lack of scalability of offering print services.

A known 'distribute and print' technology is capable of limited job routing. The mediaflex system provides a print on-demand e-service for print service providers, but does not manage printing. The known Print Shop is a software RIP which also provides queue management and routing capabilities. Ocè provides a queue manager tool that also works as a printing tool for some file formats. However, all known approaches provide only pieces of technology, which in the main are not automated at all. Known solutions do not handle a complete printing problem, and known solutions do not handle the fulfillment problem of fulfilling a complete print order. Few known solutions handle the problem of content transmission over the internet.

SUMMARY OF THE INVENTION

One object of the present invention is to provide an infrastructure for print on demand services provided over the internet, with full automation of print ordering, including competitive tendering for print services, and automated printing prior to delivery of prints to a customer.

Another object of the present invention is to provide a fully automated workflow from customer to printer device, which sends print orders to selected print service providers, on criteria including the availability of those print service providers, and the suitability of those print servers to provide print products, based upon the capacity and capability of those print service providers. Within each print service provider, images are arranged by a print manager computer at the print service provider to print onto media in an efficient manner, without having to change media or print device set-up, e.g. change media type such as canvas, paper, plastics or the like, or change the type of inks loaded into the printer devices, whilst at the same time efficiently utilizing the area of the print media.

An automated print on demand service as disclosed herein, is accessible over a communication network, for example the internet and matches a plurality of customers for print services to a plurality of print service providers, satisfying orders for print services placed by the customers on-line over the network. Customers may include content retailer website operators, providing a content selection made available to the general public over the internet. For example, content retail websites may make available a series of images suitable for producing large format posters which can be ordered by the general public, or to subscribers of the website using an e-commerce engine comprising the content retailer website. Other customers may include direct customers such as design agencies, marketing companies or the like who may generate repeat business for orders of print products.

A programmatic interface is provided to content retailer websites to enable those websites to fulfil requests for on-line printing via a print merchant. The print merchant is responsible for sending the content to a selected print service provider who prints the demanded print items. Prints are shipped to the user by a courier service. The end user may be the customer themselves or who may be a person specified by the customer. The programmatic interface provided to the content retailer websites comprises a set of libraries which facilitates the connection of the website to the print merchant.

Specific implementations of the present invention encompass the whole production program process for a print on demand e-service including:

- e-service—ordering and selection of print products on-line
- downloading of content image data over a communications network, e.g. the internet
- routing of print orders to individual print service providers, on-line
- printing of print products at individual print service providers
- finishing of print products, by applying special finishes at the print service provider, e.g. lamination
- final shipping to the end user/customer by means of a courier According to a first aspect of the present invention there is provided an on-line print network comprising a plurality of computer entities connected by a communications network, for providing on-line print services, said print network comprising:

a print merchant computer entity capable of receiving orders for print items over said communications network;

a plurality of print manager computer entities, each said print manager computer entity in communication with said print merchant computer entity over said communications network;

a plurality of printer devices, wherein one or more said printer devices are connected to one or more said print manager computer entities, wherein said printer devices receive instructions for printing a plurality of print products, from a said print manager computer entity, said print manager computer entity instructing said printer devices in response to an order for print items received from said print merchant computer entity.

According to a second aspect of the present invention there is provided a print service provider operation comprising:

at least one print manager computer entity, and a plurality of printer devices, said print manager computer entity operating to receive an electronic order for print items, said order comprising one or a plurality of print jobs each representing at least one print item to be printed, said print manager computer entity operating to distribute a plurality of print images on at least one two-dimensional print media, in a manner which optimizes usage of an area of said print media.

According to a third aspect of the present invention there is provided a method of providing on-line print services, said method comprising the steps of:

receiving at least one order for print products on-line;

electronically distributing said at least one order to at least one print service provider facility;

within a said print service provider facility, electronically allocating said order to at least one printer device; and printing at least one print item according to said order.

According to a fourth aspect of the present invention there is provided a method of allocating a plurality of print items amongst a plurality of printer devices comprising:

receiving an order for a plurality of print items to be printed;

distributing said plurality of print items amongst said plurality of printer devices in a manner which optimizes usage of print media loaded into said plurality of print devices.

Other aspects of the present invention are as recited in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 9 illustrates schematically a list of printer device resources available within a print service provider, and storing data describing the set up and current utilization of those printer devices;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Whilst the following description applies to a plurality of computer entities communicating over the internet, it will be understood by the person skilled in the art, that in general such entities may communicate over any communications network, including virtual private networks (VPN's), local area networks (LAN's), mobile telecommunications networks or the like.

In this specification, the term 'on-line' used in the context of computer entities or businesses, means a computer entity or business as appropriate, which can send and/or receive products and/or services in the form of electronic data over a communications network. The computer entity and/or business may also be capable of carrying out transactions over the communications link, in the form of exchanges of electronic data with other computer entities or businesses, over the communications network.

In this specification, the term 'communications network' includes any communications network over which a plurality of computer entities can communicate with each other by transfer of electronic data files. Such networks include both packet switched and circuit switched networks, and hybrids of packet switched/circuit switched networks. Examples of such networks include the internet, wide area networks (WAN's). Various protocols such as internet protocol (IP); asynchronous transfer mode (ATM); wireless application protocol (WAP) and the like may be used.

Figure 1:
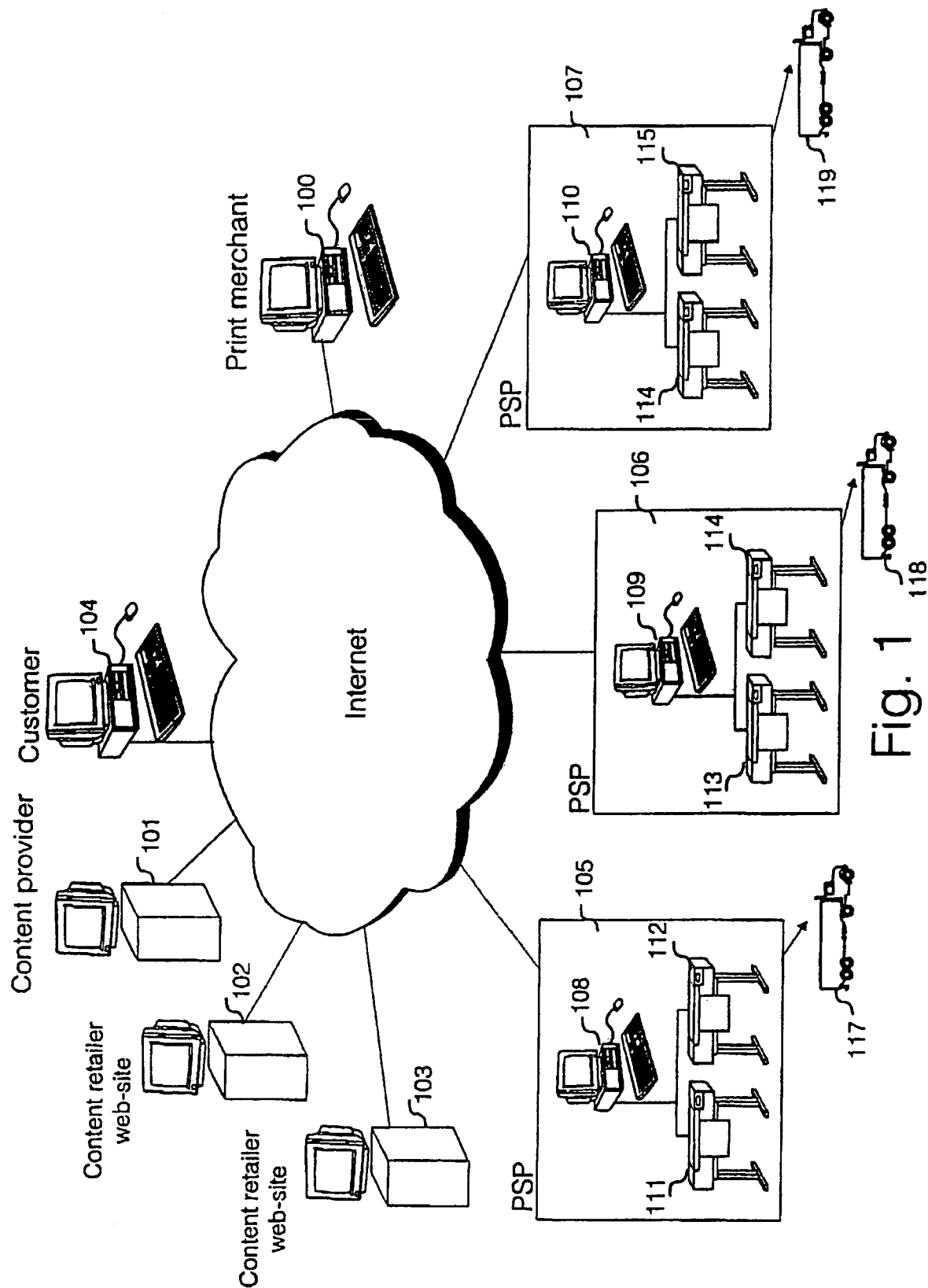
FIG. 1 illustrates schematically an on-line distributed printing network for providing efficient allocation of print services to a plurality of customers.

Referring to FIG. 1 herein, there is illustrated schematically a physical architecture of an on-line distributed printing network for providing printing services to a plurality of customer terminals 104, in response to a plurality of orders from customers, who may also be the end users. The network comprises a plurality of internet-enabled print service providers 105-107 each capable of providing physical prints in response to orders for printed images; an internet-enabled print merchant computer entity 100 for matching a plurality of orders for print services to the plurality of print service providers 105-107; one or a plurality of internet-enabled content provider computer entities 101 capable of providing image data; a plurality of content retailer computer entities 102, 103, each capable of receiving orders from subscribers, e.g. the general public, for printed images; and one or a plurality of courier service providers 117-119 acting to deliver physical prints to specified end users.

Individual internet-enabled businesses may be characterized by the service or product which they provide, and the type of computer entity which they utilize as follows:

A content retailer business, has a content retailer computer entity 102, 103 and provides image content on-line to customers by offering such content via a website. The customers, usually direct retail customers e.g. members of the public, using personal computers having web browsers may view web pages made available at the content retailer computer entity, and may order on-line prints of those images, using a known web site e-commerce engine for handling payment details.

A content provider business has a content provider computer entity 101, storing a plurality of image data, of interest to individuals and businesses and deliverable on-line. For example, a content provider business may provide a library of pictures, in data format, stored in a database and made accessible over the internet by a content provider computer entity 101.

A print merchant business, has a print merchant computer entity 100, and provides a service to business customers, direct retail customers, content retailer websites and content providers, as well as to one or more print service providers. For the content retailer business, the print merchant allows conversion of orders from subscribers to those content retailer business into high quality prints which can be sold by the content retailer websites, with reliability of print and delivery to end users. For the content retailer website, the print merchant business offers the proposition to convert their image content into high quality posters which the content retailer website can sell direct to their on-line customers. The print merchant business handles the printing and delivery service for the content retailers business with reliability. For the print service providers, the print merchant offers capture of printing demand to keep the print service providers busy and provides assistance in managing workflow automatically to the print service provider. Print service providers are connected to print manager 100 by their print manager computers, which act as e-servers 108-110. Each e-server allows a plurality of printing devices 111-115 to be connected to the print merchant. For the print service providers, the print merchant business offers the proposition of capturing printing demand, particularly large format printing demand for the print service providers, and providing the equipment to help the print service provider manage a print on-demand printing service to fulfil the demand, managing workflow automatically within the print service providers operation, and minimizing manual intervention.

A print service provider business comprises an on-line enabled print manager computer entity 108-110, and one or a plurality of printer devices 111-115, the print manager computer entity capable of receiving orders from the print merchant computer entity on-line, e.g. over the internet, and capable of receiving on-line image data direct from the content provider computer entity, content retailer entity, or print merchant entity.

Individual customer computer entities connect to the internet in known manner using, for example, a modem, ISDN line, or the like. It will be appreciated by those skilled in the art that whilst communications between computer entities have been described as being over the TCP/IP internet, in the best mode, the invention is not restricted to such means of communications, but may make use of any suitable communications network or a mixture of network links, including, but not limited to, virtual private networks (VPN's), local area networks (LAN's), wide area networks (WAN's), using any suitable routing and/or transport protocols.

A customer terminal 104 may include any computer entity capable of sending an order for print products or print services to a print merchant business 303 or a content retailer business 302. Customer terminals may be categorized into two basic types: firstly, those without the facility to directly order print products or services from print merchant computer entity 100. Herein after these terminals are referred to as retail customer terminals. Secondly, customer terminals having means for ordering print products or services directly from print merchant computer entity 100 herein after this type of customer terminal will be referred to as a business customer terminal. Business customer terminals are enabled to send image data directly over an on-line communication, e.g. the internet, to print service manager computer 100, as well as give orders for print products and services. Retail customer terminals typically comprise a personal computer or the like, equipped with a web browser as are known in the prior art.

Content provider computer entity 101 comprises a database storing a plurality of digital image content data representing a plurality of images, and an internet compatible communications interface, making available the digital image content data over a communications link.

Print manager computer entity 100 comprises a server computer capable of communicating on-line with the plurality of print service providers 105-107, one or a plurality of content provider computers 101, one or a plurality of content retailer computer entity 102,103, one or a plurality of business customer terminals, and optionally one or a plurality of server computers belonging to one or a plurality of respective courier businesses.

Figure 2:
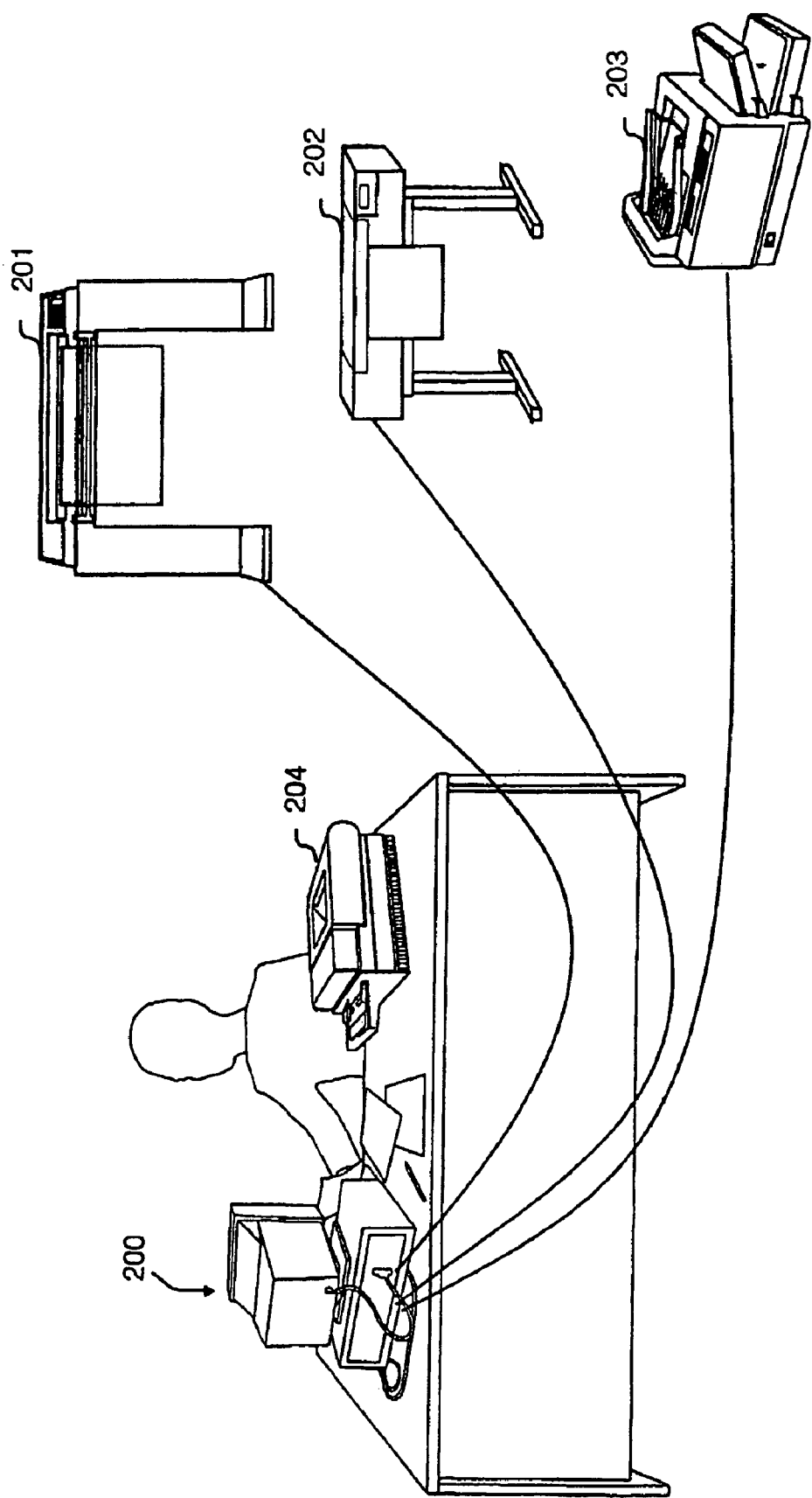
FIG. 2 illustrates schematically a physical view of part of an internet enabled print service provider business according to a specific implementation of the present invention.

Referring to FIG. 2 herein there is illustrated schematically a view of one example of a print service provider facility 105. Print service provider facility 105 comprises at least one print manager computer entity 200, one or a plurality of printer devices 201-203 for printing out print products encompassing images or other document types e.g. PDF files received via print manager 200, the plurality of printers printing out under control of print manager 200 which automatically allocates print jobs to individual printers, depending upon a media type stored on the printer, and according to algorithms for efficient utilization of print media and printer resources. Additionally, the print service provider facility comprises a finishing department, not shown in FIG. 2, for applying special finishes to print products, for example lamination, gloss finishes or the like; and a shipping department for packaging orders of print products into packaging, for example roll tubes, boxes or plastics, envelopes.

The plurality of printer devices 201-203 may provide a selection of different printer devices capable of handling different sizes of print media. Each printer device receives instructions for printing of images, as well as image data itself from the print manager computer 200 according to print orders received over the internet by print manager computer 200. Print manager 200, additionally prints out instructions to human operators, in the form of paper work order sheets and packing slips containing labels, to enable human operators to collect print products from the plurality of printer devices, and to efficiently process the print products through the finishing department and shipping department. The instructions may be printed via a locally connected peripheral printer 204, e.g. a HP LaserJet device or similar.

Figure 3:
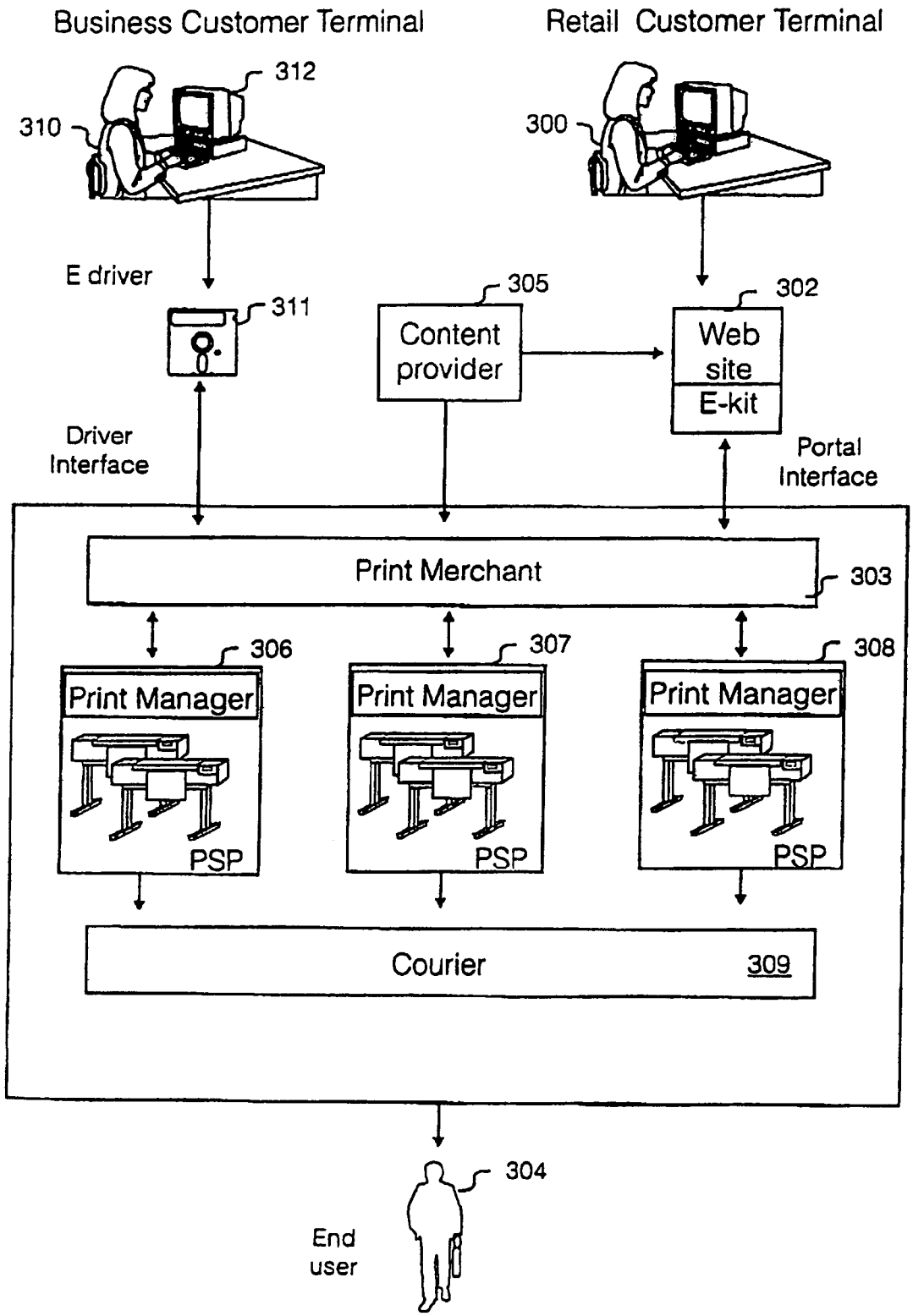
FIG. 3 illustrates schematically a logical overview of an on-line distributed printing network according to the specific implementation of the present invention.

Referring to FIG. 3 herein, there is illustrated schematically a logical architecture of the on-line distributed printing network shown in FIG. 1 herein. Various types of customer are envisaged. A first type of customer 300 (a retail customer) includes members of the general public accessing the internet by conventional manner, typically using a personal computer, or equivalent type computer 301 equipped with a conventional web browser facility. The retail customer 300 surfs the world wide web to find a website 302 provided by a content retailer business. The customer selects an image content, e.g. a poster from the website, and the content retailer 302 then instructs print merchant business 303 to provide and deliver one or more posters to an end user 304 specified by the customer who may be the customer themselves, or a third party specified by the customer by placing an order at content retailer website 302. Image data for the content, i.e. the image order by the customer 300, may be provided from an internal database at the content retailer website 302, or via an external content provider 305 who may send that image data over the internet to content retailer website 302, or direct to print merchant 303, as instructed by an order from content retailer website 302 to print merchant 303. Having received an order from content retailer website 302, print merchant 303 selects one or more of a plurality of print service provider businesses 306-308, based upon criteria of:

Availability of print service provider to fulfil the order.
Price quoted by the print service provider(s) for fulfilling the order.
Any other contractual terms which the print merchant business 303 holds with one or more of the print service provider businesses 306-308.
A time a print service provider will take to fulfil the order.
The capabilities of the print service provider, e.g. the media types and sizes which the PSP can handle.

A print service provider receiving an order from print merchant 303 fulfils that order by printing the necessary print products specified in the order, and ships these to the end user 304 using a courier business 309.

A second type of customer 310 may include business customers, for example graphics design businesses, advertising agencies, architectural practices, or any professional or manufacturing service or business requiring flexible printing services, and operating graphics software packages capable of generating image data for printing in electronic format. Business customers 310 differ from retail customers 300 in that they may interact directly with print merchant business 303 by means of a driver interface 311 supplied by print merchant business 303 enabling a business customers in-house graphics computer 312 to communicate directly with a print merchant computer entity at the print merchant business 303. Business customers 310 may generate their own image content through their in-house graphics software, which may be sent to print merchant business 303 in order to fulfil a business customer order for printed products incorporating image data supplied by the business customer.

Figure 4:
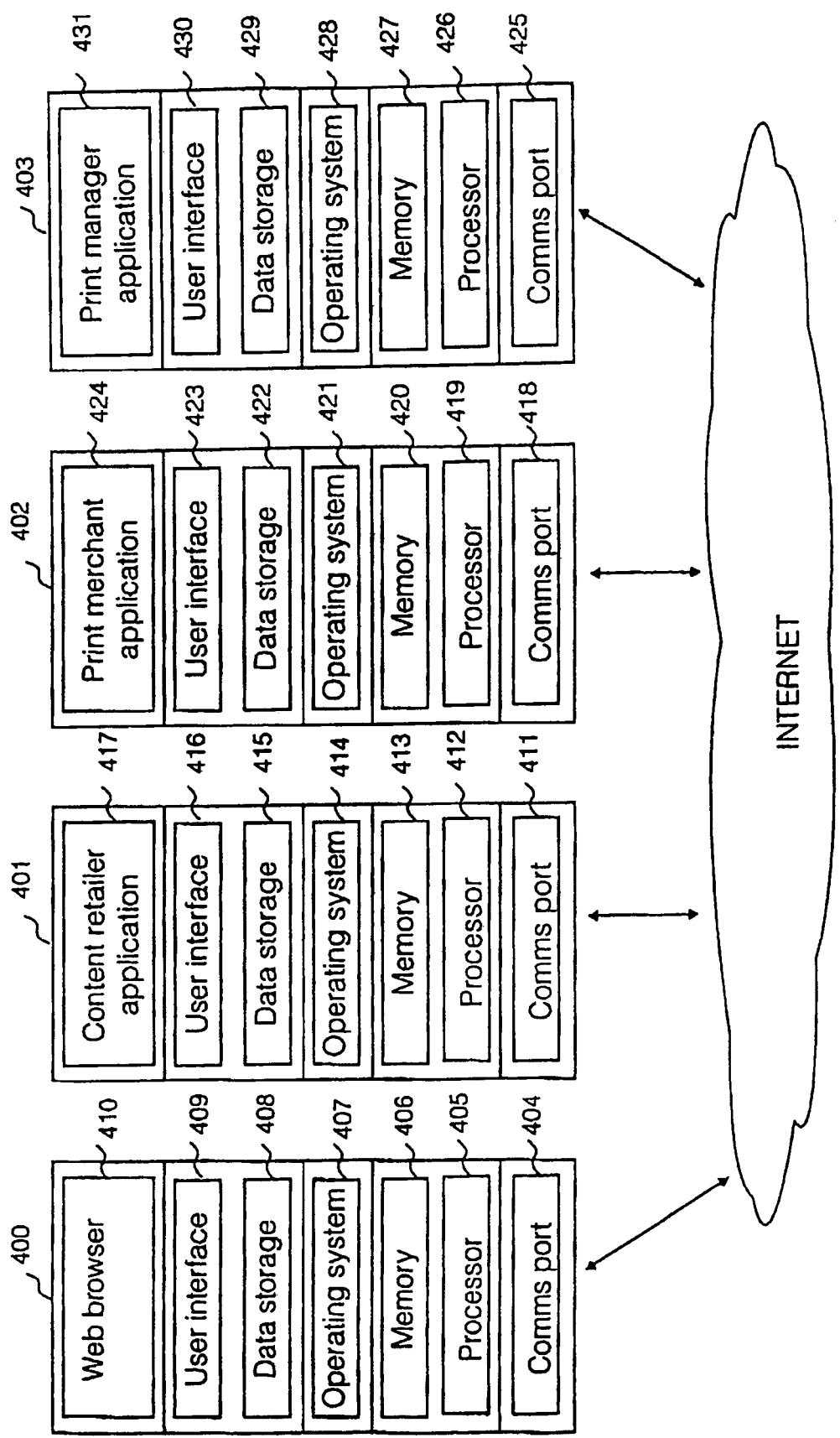
FIG. 4 illustrates schematically components of a retail customer terminal, content retailer computer, print merchant computer, and print manager computer comprising the distributed printing network of FIG. 1.

Referring to FIG. 4 herein, there is illustrated schematically components of a retail customer terminal 400, content retailer computer 401, a print merchant computer entity 402, and a print manager computer entity 403.

Retail customer computer entity comprising a communications port 404, a processor 405 with associated memory 406, an operating 407, for example Unix®, Linux®, Microsoft NT/2000®, a data storage device 408, e.g. a hard disk drive or similar, a user interface 409 and a web browser application 410. Content retailer computer 401 comprises communications port 411, a processor 412, with associated memory 413, a conventional operating system 414, a data storage device 415 and user interface 416 including a visual display unit, keyboard and pointing device, and a content retailer application 417.

Print merchant computer entity 402 comprises a communications ports 418, a processor 419, with associated memory 420, an operating system 421, a data storage device 422, for example an hard disk drive or RAID array, optionally a user interface 423 including visual display unit, keyboard, pointing device, e.g. a mouse or trackball, and a print merchant application 424.

Print manager computer entity 402 comprises a communications port 425 for communicating with other computer entities on-line; a processor 426; memory 427, including random access memory and read only memory; an operating system 428, e.g. Linux®, Unix®, Windows NT/Windows 2000®; a data storage device 429 e.g. hard disk drive, RAID array or the like; a user interface 430 enabling a human operator to interact with the print manager computer, the user interface comprising a visual display unit, keyboard and a pointing device, e.g. a mouse, trackball or similar; and a print manager application 431 acting as a e-server for communicating with print merchant computer entity and for controlling locally a plurality of printer devices and other resources within a print service provider facility.

Figure 5:
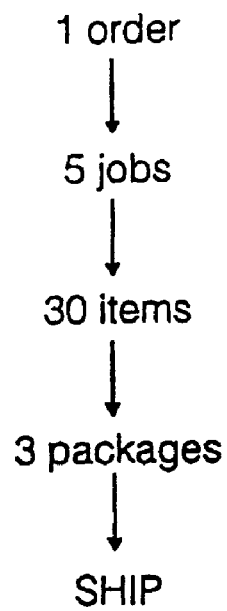
FIG. 5 illustrates schematically an overall division of a received customer order into a plurality of jobs, a plurality of print items for shipping in a plurality of packages.

Referring to FIG. 5 herein, there is illustrated schematically how a customer purchase of a plurality of print products is handled logically by the printing network. A customer purchase is handled by the print merchant computer 100 as an order. An order comprises a set of different jobs each having a same shipping address. Normally, an order would result as a consequent of purchasing on-line using a shopping basket type interface. An order may comprise for example a plurality of individual print images selected from a website by a customer, or to be shipped to a same address, typically the customer's own domestic address. A job comprises a number X copies of exactly the same poster, that is to say a number X sheets of paper. A poster comprises one single sheet of print material, having content printed on it, the content being either text, image, photograph of the like. Print items, having been printed, are grouped for shipping to a same address, and are normally sent together in a same package. Examples of a package include a conventional tube package, or a flat package.

Figure 6:
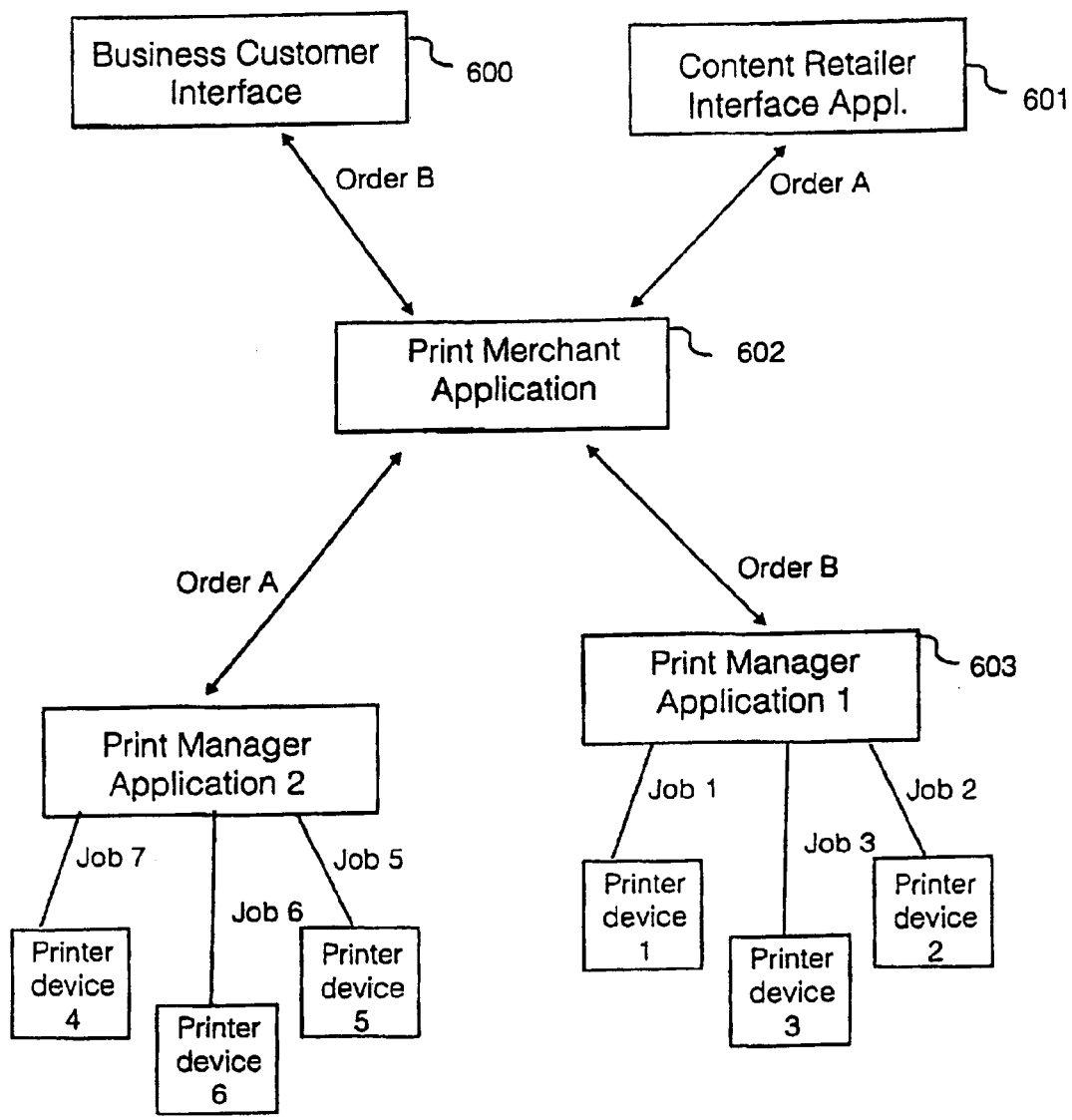
FIG. 6 illustrates schematically logical components implementing the on-line distributed print network of FIG. 1.

Referring to FIG. 6 herein, there is illustrated schematically logical components required to implement the on-line distributed printing network of FIG. 1, in one implementation. The logical components may comprise applications programs suitable for installation into conventional general purpose computers, to adapt those computers to perform the functions of a business customer terminal, a content provider computer entity, a content retailer computer entity, a print manager computer entity, and a print merchant computer entity. Logical components may include a business customer interface application 600, for interfacing with a customer's own graphics application, a content retailer interface application 601 for interfacing the content retailer computer entity with the print merchant computer entity; a print merchant application 602 resident in the print merchant computer entity 100 for carrying out the functions of the print merchant computer entity; and a print manager application 603 resident in print manager a computer entity 107, enabling operation of that computer entity. In other implementations, the logical entities 600-603 may be provided as application specific integrated circuits in embodiments of computer entities which are not based upon general purpose computers, but are custom built. However, the logical entities are optimally implemented as applications which can be incorporated into the various computer entities.

Figure 7:
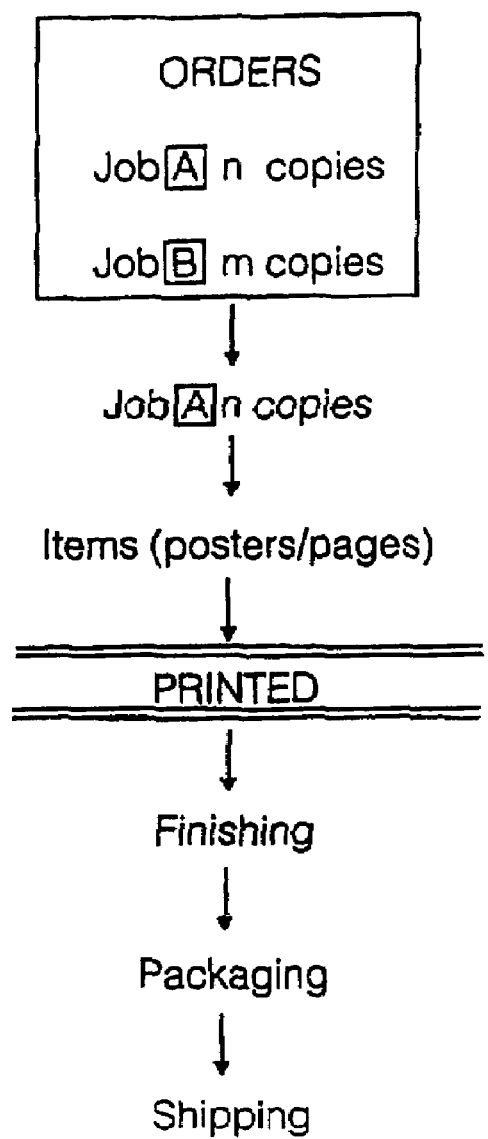
FIG. 7 illustrates schematically within a print service provider, how a print manager computer receiving an order treats the order as a plurality of jobs, each having a plurality of individual print items to be printed.

Referring to FIG. 7 herein, there is illustrated schematically how a plurality of electronic orders received at a print manager computer 108-110 in a print service provider facility are processed through the print service provider facility. Processing of a single order is shown, although in practice the print manager computer may be handling several orders at a same time. The order comprises a plurality of jobs, for example job A having a number n copies, a job B having a number m copies. Each job is broken down to a plurality of individual print items, e.g. pages or posters, which are printed. The printed print items are then sent to a finishing department, and are packed and shipped to their final destination as specified by the order.

Figure 8:
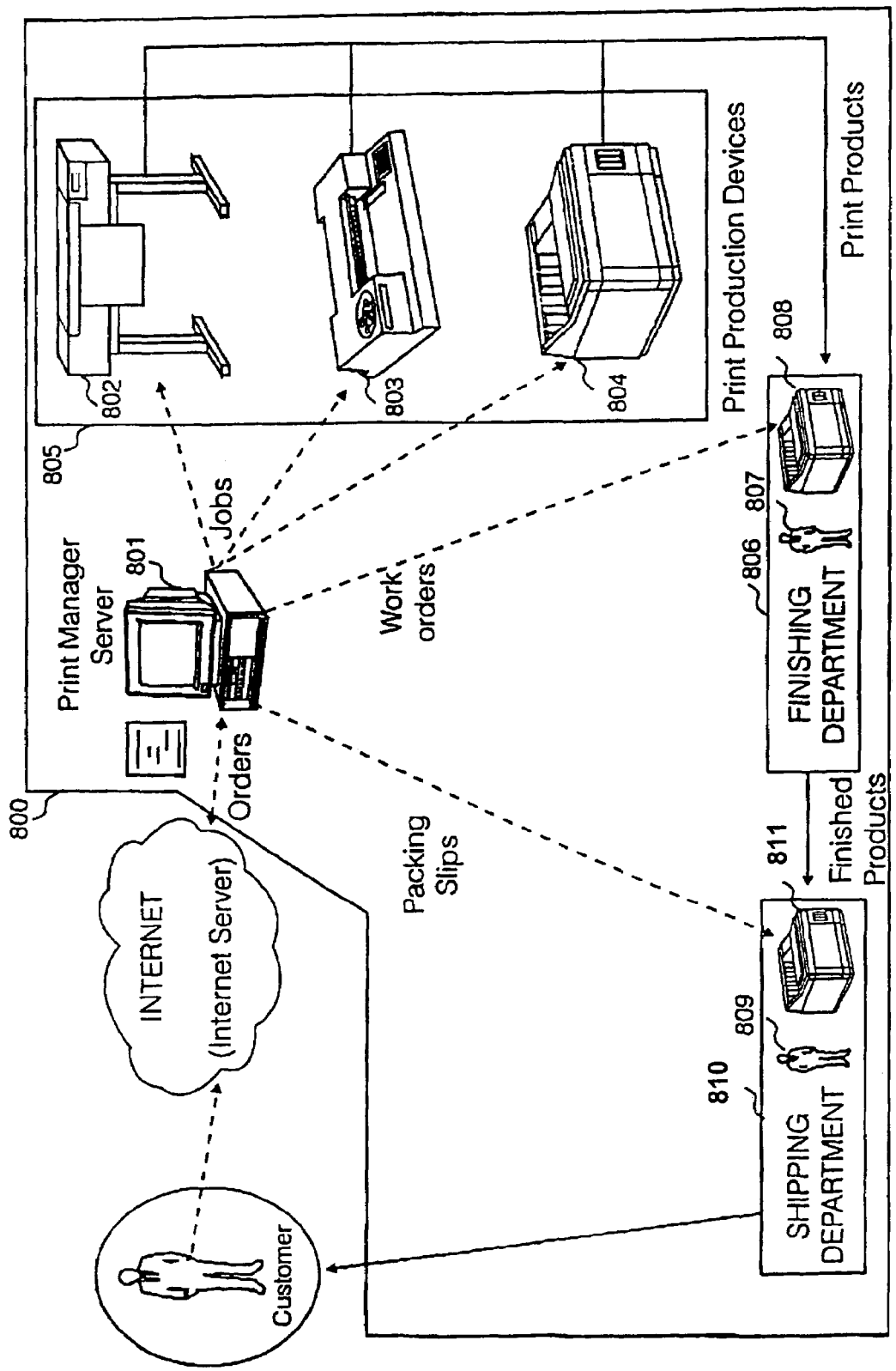
FIG. 8 illustrates schematically distribution of a plurality of print jobs to a plurality of printers within a print service provider.

Referring to FIG. 8 herein, there is illustrated schematically an organization of a single print service provider, showing how an order is allocated for printing amongst a plurality of printer devices. The print service provider 800 comprises a print manager computer 801, linked via a local area network to a plurality of printers 802-804 in a print department 805, individual ones of the printer devices typically having different print capabilities to each other, for example small format printer devices such as HP LaserJet devices 804, or large format HP DesignJet printer devices 802; a finishing department 806 containing equipment 808 for applying special finishes to printed print items, e.g. laminate finishes or glossy finishes which are applied by human operators 807; a shipping department 810 for assembling packages of print items comprising an order, or with the same shipping address, the packaging done by one or more human operators 809 or mechanical operators 811. The print manager computer 801 receives a plurality of electronic orders from the print merchant computer over the internet and orders these in a queue for printing. Individual orders are broken down within the print manager computer into a plurality of jobs, which are allocated amongst the plurality of printer devices, by means of an allocation algorithm, which allocates print jobs according to availability of printer device, type of media format including ink and sheet material already loaded on the printer device, and utilization of each printer device. The print manager computer also generates physical, e.g. paper-based work order documents, comprising a set of instructions to human operators in the finishing department 806 and print department 805, and packing slips containing packing labels for packing print items for satisfying an order, used by human operators 809 in the shipping department.

Referring to FIG. 9 herein, there is illustrated schematically data concerning a plurality of printer devices associated with a print manager computer 801 at a print service provider facility. The data stored by the print manager computer, and updated in real-time through status signals received from the plurality of printers includes a printer identification code 900, each identifying a corresponding respective printer device; for each printer device, a format 901 of print sheet material which the printer device is currently configured to print on, for example A0, A1, A2, A3, A4, A5; a sheet material type 902 describing a type of sheet material currently loaded into a printer, for example paper, canvas, plastics material or the like; an ink set type 903, for example a dye based ink set, or a pigment based ink set type identified by a unique code, suitable for printing on a particular sheet or roll material type, e.g. plastic or canvas or for special applications such as indoor or outdoor; a current loading 904 of the printer device specified as a number of pages currently in a queue to be printed at the printer device.

When ordering a print product, a customer may specify either indoor or outdoor usage. Two different sets of ink are generally employed, either dye-based or pigment-based, depending upon whether usage is for images to be displayed indoor or outdoor. An ink set comprises a plurality of different ink colors loaded onto a printer device. A conventional ink set may comprise four different inks such black, magenta, cyan, and yellow. Special applications may require usage of an extended ink set including light cyan, and light magenta, while further applications, for example photographic applications may include green and orange inks. Each ink is of a particular color and a particular type, e.g. dye based or pigment based or other special inks, such as inks for printing on textile media. An ink set can comprise an ink tank, a print cartridge, and a print head cleaner. Changing an ink set involves replacement of these four components. Changing an ink set already loaded onto a printer device is time consuming and involves wastage of ink and further, is not a clean process, often requiring an operator to wear gloves, and protective clothing to protect against ink leakage or splashes. Minimization of changes of ink sets in the printer devices is desirable. The print manager computer 801 may take into account minimization of ink set changes when allocating print items to individual printers.

Figure 10:
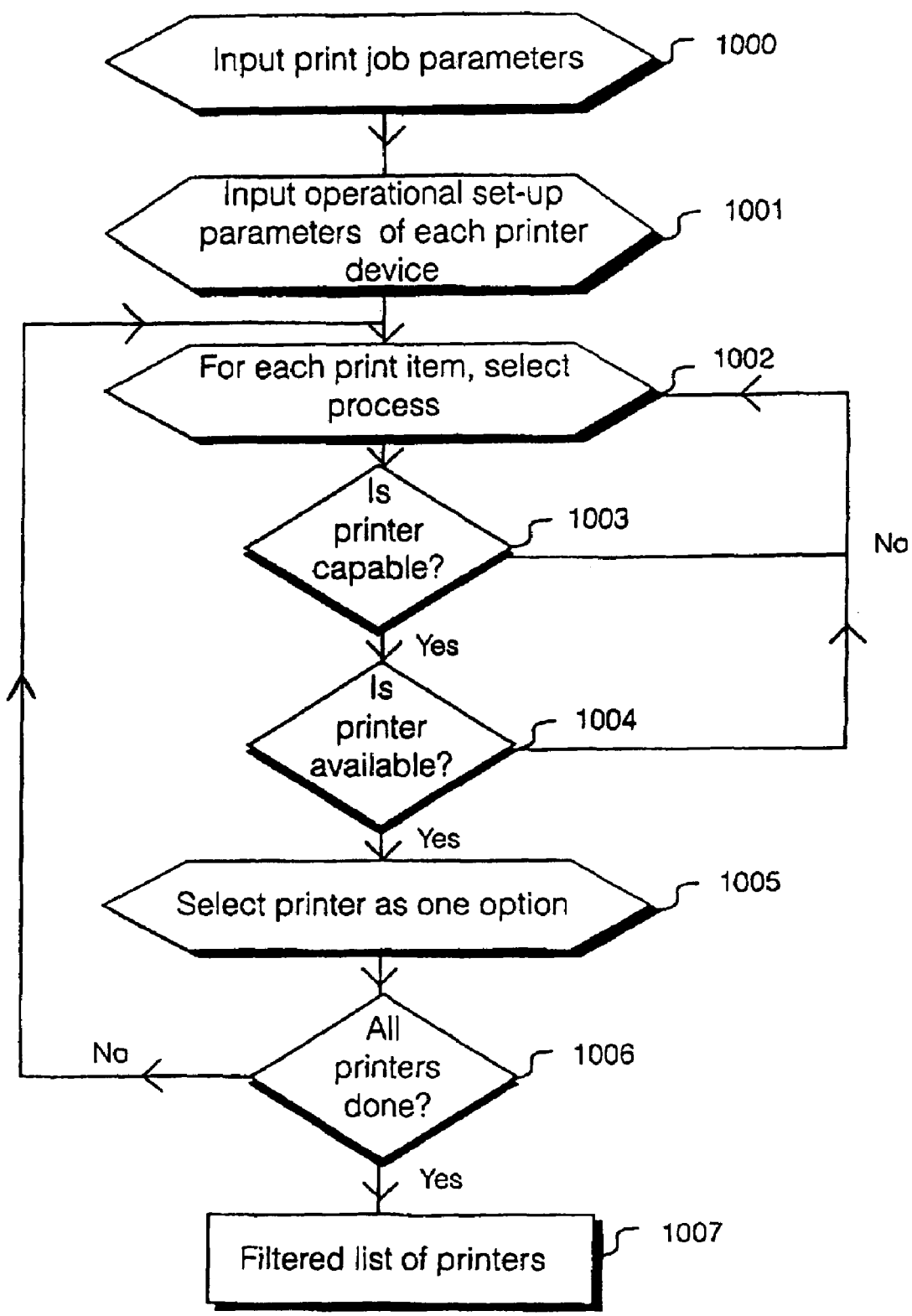
FIG. 10 illustrates schematically an algorithm for compiling a filtered list of printer devices suitable for satisfying a particular print job.

Referring to FIG. 10 herein, there is illustrated schematically a mode of operation of the print manager computer for compiling a list of suitable printers for satisfying a print job. In step 1000, the print manager computer selects a print job from a stored list of print jobs in a print job queue awaiting allocation to individual printer devices. The print job parameters, comprising media size, such as sheet material dimensions, media type, for example sheet material type, e.g. canvas, paper or the like and ink type, e.g. dye based or pigment based. Additional ink types may include e.g., light cyan, light magenta, green and red. In step 1001, operational set up parameters of each printer device are examined by the print manager computer. The operational set up parameters are available in the printer status list illustrated in FIG. 9 and include, for each printer, the currently loaded format, the sheet material type, the ink type and the current load of the printer device. A print job comprises a plurality of print items, each the same. For each print item, a printing process is applicable in order to obtain the required finished print item. This information is read in step 1002. In step 1003 it is checked from the input operational set up parameters whether each individual printer is capable of printing that particular process. Printers which are loaded with an incorrect format or media type are discarded from the list of printers for the particular job being processed. In step 1004, if a printer is capable of producing a print item as specified, then it is checked whether the printer is available. If a printer has a high current load, that is a current load above a predetermined value, which can be set individually for each individual printer device, then the printer device is discarded as being unavailable. Further, the printer may be unavailable if the printer is checked by the print manager computer outside a predetermined time window. Printers may experience certain periods of downtime, for example for changing of media types, maintenance and the like. Maintenance and media type changes may be scheduled, and the printer device may be unavailable outside scheduled availability times. At other scheduled times of unavailability the printer device may be used by the print service provider for print jobs from other customers, which are not received through the print manager computer. If a printer device has a current load which is within the predetermined value, then in step 1004 the printer device is selected as one option on a list of printers filtered for the particular print job being processed. In step 1006 it is checked whether all printers on the printer list of FIG. 9 have been considered, and once all printers have been considered, a filtered list of printers 1007 results. A filtered list of printers for that particular job comprises printers which are capable of printing that job, and are available. If the filtered list of printers turns out to comprise no printers, that is no capable and available printers are on the list, then the algorithm repeats, waiting for a capable printer to become available. Print items having specifications which the plurality of printer devices are incapable of satisfying should not have been received by the print manager computer, these being filtered at a higher level by the print merchant computer. The capabilities of the print service provider are checked at the print merchant level, to see which media types the print service provider can print, e.g. canvas, vellum, glossy or the like, media sizes, A0, A1 etc. If these criteria are not met, then an order is not assigned to a particular print service provider. However, for orders which have been received, and which are within the print service providers normal capabilities, a printer device may be temporarily unavailable, because it is loaded with the wrong media type or ink set to fulfil the order, or because the printer device is busy. Under these circumstances, manual intervention by a human operator may be required at the print service provider.

Figure 11:
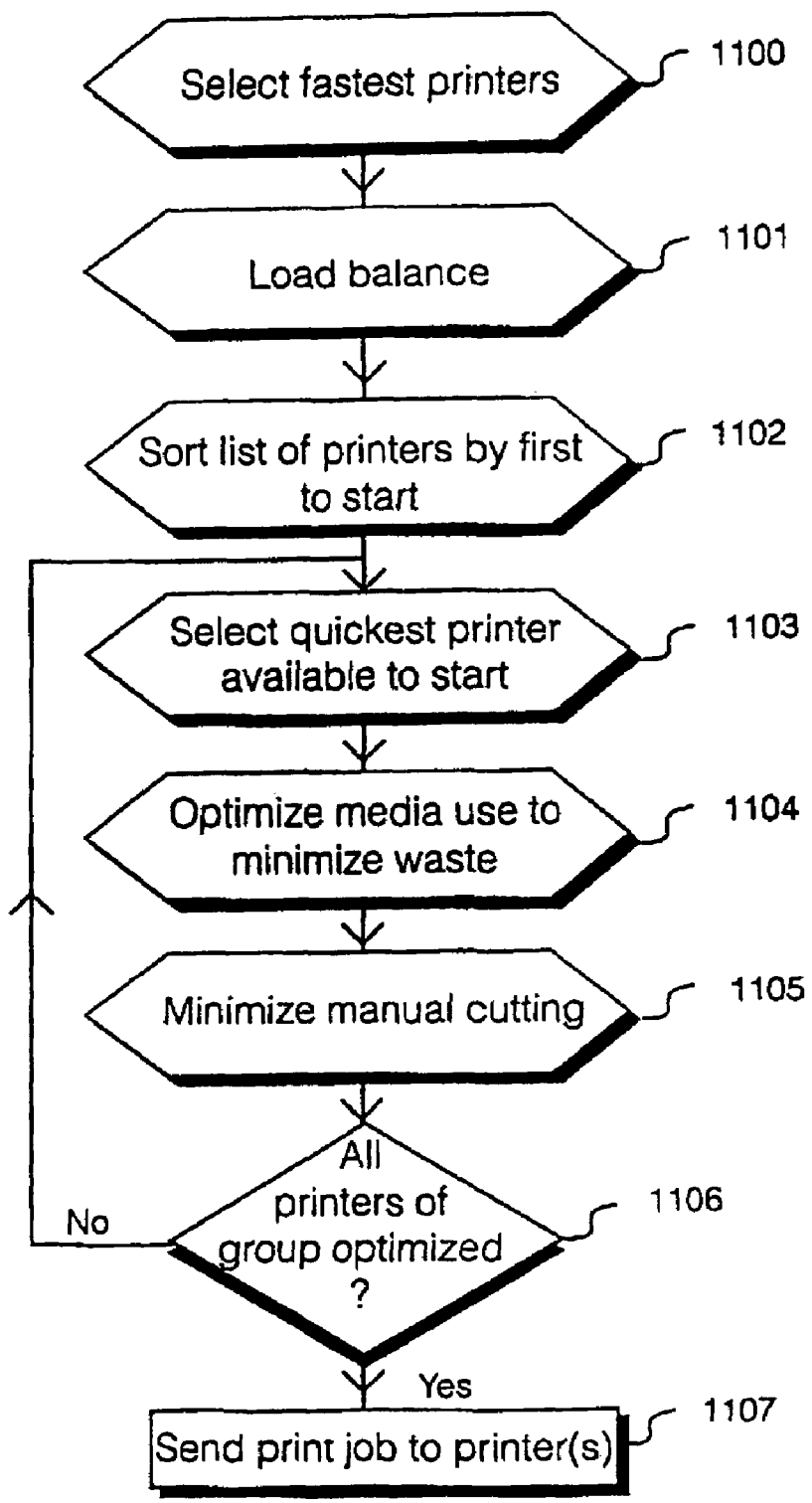
FIG. 11 illustrates schematically an algorithm for overall optimization of throughput of print items through a print service provider facility.

Referring to FIG. 11 herein, there is illustrated schematically a second mode of operation of the print manager computer, for optimizing throughout of a print job of an order through the print service provider facility. In step 1100 from the filtered list of printers applicable to the print job, the fastest printer(s) are selected. Where only one printer appears on the filtered list, that printer will be selected, but where there are a plurality of printers which are both capable and available to satisfying the print job, the algorithm selects one or more printers by a load balancing routine 1101. Load balancing routine allocates the plurality of print items comprising the print job to one or more printer devices, depending upon their current load. For example, where a first printer has a current load of 20 print items, and a second printer device has a current load of 30 print items, for a print job comprising 20 items, the load balancing routine may allocate 15 print items to the printer device having a current load of 20, and 5 print items to the printer device having a current load of 30 print items, thereby balancing the current load of the two printer devices, and also resulting in the two printer devices printing their amended loads including the new print job, at approximately the same time, so that the print job can be transferred out of the print department to the finishing department and/or shipping department efficiently. The load balancing algorithm 1101 may take account of a large number, e.g. 10, of the printer devices, and there may be several combinations of individual printer devices which give roughly equivalent load balancing advantage. Additionally, within a print service provider, work orders may be balanced between individual printer devices, for optimization of media usage (minimization of media waste), or for optimization of ink set usage; or for optimization of response time, that is, to reduce the time before a work order is converted to print products, or to optimize on the combination of the parameters of reducing media wastage, reducing ink set changes, and increasing response time to obtain printed products. An optimization algorithm within the print manager computer may be user configurable by a human operator to suit the operators preference for optimizing on the basis of reduced media wastage, reduced ink set changes, fast response time, or a combination of reduced media wastage, reduced ink set changes, and fast response time. Since a contract with a print merchant depends upon response times, that is time from receiving an order to handing over print products to a courier service, a print service provider can influence the volume of work it receives by reducing it's response times, but at the expense of media wastage, which will in turn feed through to an increased overhead cost per order, and reduced profit per order. In times of low general work load, the print service provider can optimize to reduce media wastage and/or reduce ink wastage. In step 1102, the filtered list of printers, which are also preselected into groups of printers in which load balancing can be achieved are selected on a first to start basis. That is to say the groups having the lowest overall current loads are selected. In step 1103, the first printer available to start in that group is selected, and is in step 1104 usage of the media is optimized in order to minimize waste.

Figure 12:
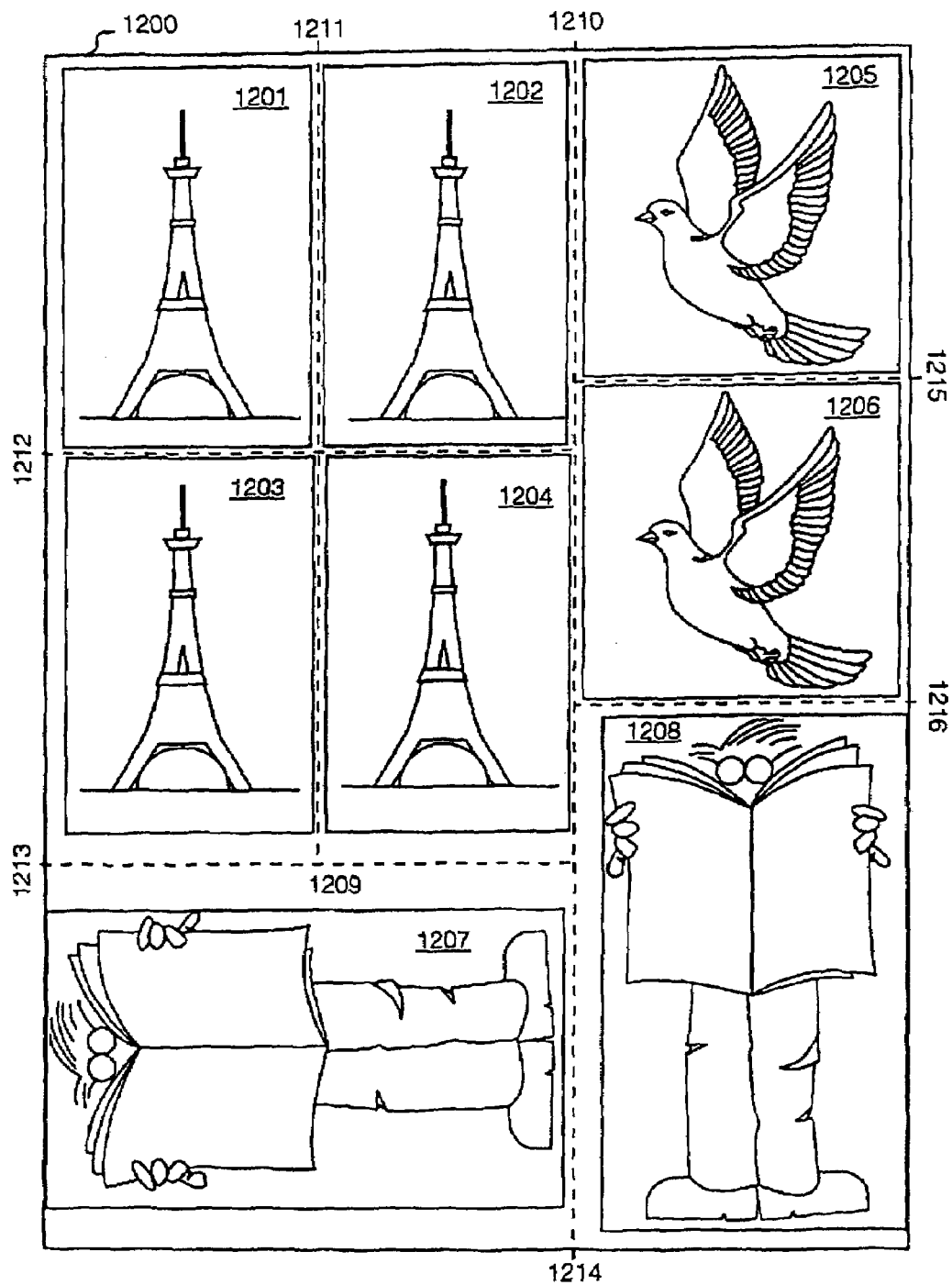
FIG. 12 illustrates schematically how a plurality of print items may be arranged on a sheet material, to obtain a maximum utilization of sheet material, whilst minimizing a number of cuts made by a human operator to the sheet material.

Referring to FIG. 12 herein, there is illustrated schematically a sheet of material 1200 having print items from 2 separate jobs, job A being print items 1201-1204, job B being print items 1205, 1206 and job C being print items 1207, 1208, all printed on a same sheet of material at once. Optimization of media usage, that is the sheet material usage, may be achieved by a backtracking algorithm, which assigns a plurality of virtual print items to one or a plurality of virtual material sheets. The virtual print items may be constructed as dimension data within the algorithm and similarly for the virtual material sheets.

In step 1105, the algorithm is applied to minimize the number of cuts which a human operator needs to make to cut the sheet material up in order to produce individual print items. If all printers of a group are optimized, step 1106 proceeds to step 1107, which sends print job to printer(s). If not, step 1106 proceeds to step 1103. In FIG. 12, although the usage of the print material is high, the number of cuts needed to be applied by a human operator is also high, being at least 6 cuts 1210-1216.

Figure 13:
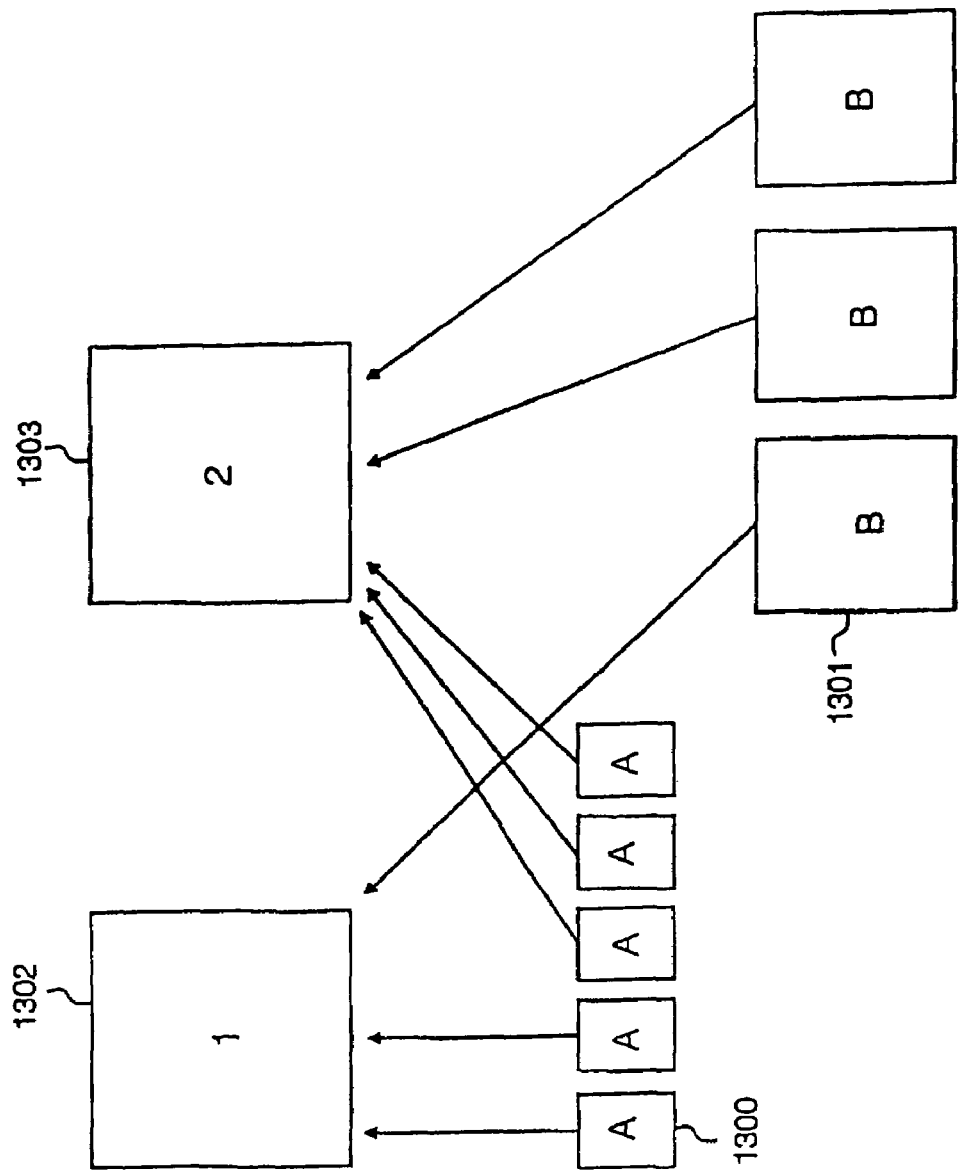
FIG. 13 illustrates schematically a virtual arrangement of print items onto a plurality of virtual material sheets, according to an algorithm for optimizing utilization of sheet material.
Figure 14:
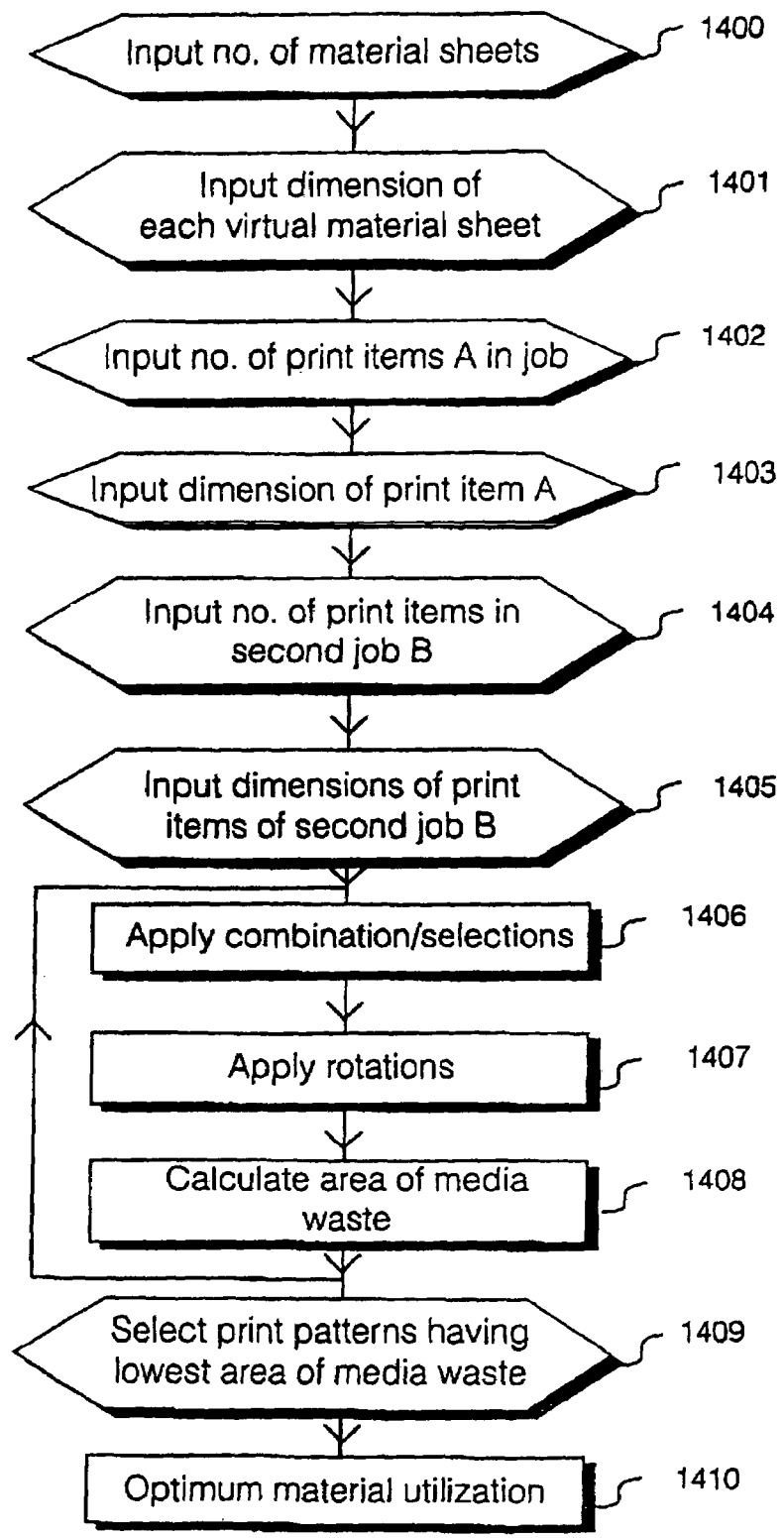
FIG. 14 illustrates schematically an algorithm for optimizing usage of sheet material.

Referring to FIG. 14 herein, there is illustrated schematically an algorithm for optimizing usage of sheet material print media. As in the example of FIG. 13, where two sheets of material 1302, 1303 are considered for printing a plurality of 5 first print items 1300 (A) and 3 second print items 1301 (B) of a second print job. In step 1400, the algorithm inputs the number of material sheets, in this case 2. In step 1401, the dimensions of each virtual material sheet are input and in step 1402, the number of print items in a first job A is input. In step 1403, the dimensions of a print item A in the first print job are input and in step 1404, the number of print items in the second print job B, in this case 3, is input. In step 1405, the dimensions of an item of the second print job B are input. The algorithm now stores the dimensions of each type of sheet material loaded into a printer device, and each of the print items of the two jobs considered for printing, together with the number of sheets of material, and the number of print items in each job. The stored dimension data constitute virtual print material sheets and virtual print items. The algorithm then proceeds in step 1406 to apply combinations and selections of the plurality of print items 1300 in the first print job and second print items 1301 in the second print job, and try and arrange these by applying rotations in step 1407 to the plurality of virtual material sheets. For each combination of print items from the first and second jobs, and each rotation within those combinations, a number of print items per material sheet is recorded in step 408. After a suitable number of iterations, in step 1409, a combination of selected print items from the first job and second job, giving the highest or optimum number of items per print material sheet, that is to say giving the highest utilization of sheet material 1410.

The print manager computer may select actual arrangements of print items on material sheets which give an optimum combination of sheet material utilization, and least number of cuts, in order to optimize the throughput of the whole print job through the print service provider facility.

The invention claimed is:

1. A method of providing on-line print services, said method comprising the steps of:

receiving at least one order for print products on-line, said at least one order having an item requiring a particular sheet material;

electronically distributing said at least one order to at least one print service provider facility;

within a said print service provider facility, electronically allocating said item to a printer device based on said printer device having said particular sheet material loaded on said printer device; and printing said item according to said order, with said printer device, and on said particular sheet material.

2. The method as claimed in claim 1, wherein said particular sheet material comprises canvas.

3. The method as claimed in claim 1, wherein said act of electronically distributing is based on said at least one print service provider facility being capable of printing on said particular sheet material.

4. The method as claimed in claim 1, further comprising:

electronically arranging a plurality of virtual print items on at least one virtual media sheet; and re-sorting said plurality of virtual print items amongst said at least one virtual media sheet in a manner which minimizes a number of cuts applied to said at least one virtual media sheet.

5. The method as claimed in claim 1, wherein said act of electronically allocating allocates said item to said printer device further based on a current load of said printer device.

* * * * *